(12) United States Patent
Sheh et al.

(10) Patent No.: US 7,391,584 B1
(45) Date of Patent: Jun. 24, 2008

(54) COMPENSATING FOR REPEATABLE PHASE ERROR WHEN SERVO WRITING A DISK DRIVE FROM SPIRAL TRACKS

(75) Inventors: Edgar D. Sheh, San Jose, CA (US); Yilin Cai, Fremont, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 59 days.

(21) Appl. No.: 11/593,929

(22) Filed: Nov. 7, 2006

(51) Int. Cl.
G11B 5/09 (2006.01)
G11B 21/02 (2006.01)
(52) U.S. Cl. .......................... 360/51; 360/75
(58) Field of Classification Search ....................... None
See application file for complete search history.

(56) References Cited

U.S. PATENT DOCUMENTS

| | | | |
|---|---|---|---|
| 5,576,906 A | 11/1996 | Fisher et al. |
| 5,668,679 A | 9/1997 | Swearingen et al. |
| 5,696,639 A | 12/1997 | Spurbeck et al. |
| 5,754,352 A | 5/1998 | Behrens et al. |
| 5,793,559 A | 8/1998 | Shepherd et al. |
| 5,905,705 A | 5/1999 | Takeda et al. |
| 6,067,202 A | 5/2000 | Rowan et al. |
| 6,069,499 A | 5/2000 | Cho et al. |
| 6,091,564 A | 7/2000 | Codilian et al. |
| 6,191,906 B1 | 2/2001 | Buch |
| 6,249,395 B1 | 6/2001 | Conway |
| 6,292,318 B1 | 9/2001 | Hayashi |
| 6,304,407 B1 | 10/2001 | Baker et al. |
| 6,366,225 B1 | 4/2002 | Ozdemir |
| 6,411,453 B1 | 6/2002 | Chainer et al. |
| 6,429,989 B1 | 8/2002 | Schultz et al. |
| 6,507,450 B1 | 1/2003 | Elliott |
| 6,519,107 B1 | 2/2003 | Ehrlich et al. |
| 6,587,293 B1 | 7/2003 | Ding et al. |
| 6,683,744 B2 | 1/2004 | Takano et al. |
| 6,704,156 B1 | 3/2004 | Baker et al. |
| 6,710,957 B2 | 3/2004 | Nakasato |
| 6,738,205 B1 | 5/2004 | Moran et al. |
| 6,754,025 B1 | 6/2004 | Shepherd et al. |
| 6,940,678 B2 | 9/2005 | Kuo et al. |
| 6,943,978 B1 * | 9/2005 | Lee .............................. 360/75 |

(Continued)

OTHER PUBLICATIONS

Alexei H. Sacks, et al., "Advanced Methods for Repeatable Runout Compensation", IEEE Transactions on Magnetics, vol. 31, No. 2, pp. 1031-1036, Mar. 1995.

*Primary Examiner*—K. Wong
(74) *Attorney, Agent, or Firm*—Howard H. Sheerin, Esq.

(57) ABSTRACT

A method of servo writing a disk of a disk drive is disclosed. The disk comprises a plurality of spiral tracks, wherein each spiral track comprises a high frequency signal interrupted periodically by a sync mark. A timing recovery measurement is generated in response to the sync marks, wherein the timing recovery measurement comprises a sinusoidal component. A timing compensation value is generated in response to the sync marks which estimates the sinusoidal component in the timing recovery measurement. A frequency control signal is generated in response to the timing recovery measurement and the timing compensation value, a servo write clock is generated in response to the frequency control signal, and the servo write clock and the head internal to the disk drive are used to write the product servo sectors to the disk.

18 Claims, 18 Drawing Sheets

U.S. PATENT DOCUMENTS

| | | |
|---|---|---|
| 6,967,799 B1 | 11/2005 | Lee |
| 6,972,540 B1 | 12/2005 | Wang et al. |
| 6,985,316 B1 | 1/2006 | Liikanen et al. |
| 7,002,761 B1 | 2/2006 | Sutardja et al. |
| 7,054,083 B2 | 5/2006 | Ehrlich |
| 7,068,451 B1 | 6/2006 | Wang et al. |
| 7,088,533 B1 | 8/2006 | Shepherd et al. |
| 7,333,280 B1 | 2/2008 | Lifchits et al. |
| 2003/0048562 A1 | 3/2003 | Heydari et al. |
| 2003/0184906 A1 | 10/2003 | Hanson et al. |
| 2006/0007585 A1 | 1/2006 | Ehrlich et al. |
| 2006/0103967 A1 | 5/2006 | Kim et al. |
| 2006/0171059 A1 | 8/2006 | Chan et al. |

\* cited by examiner

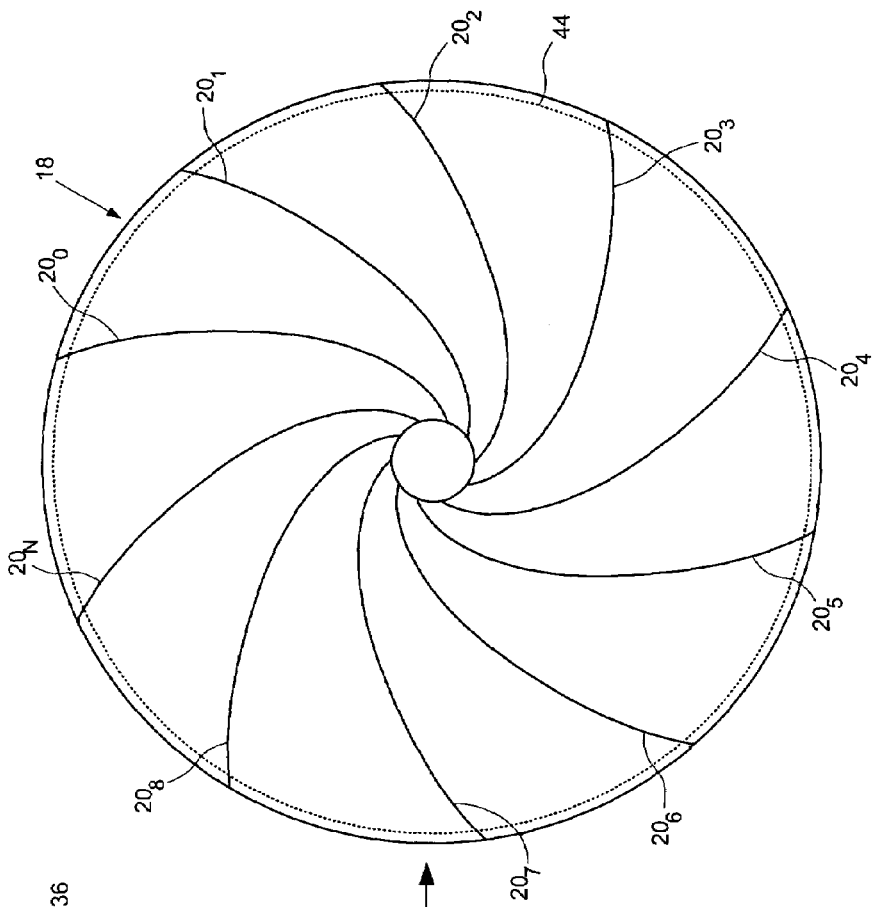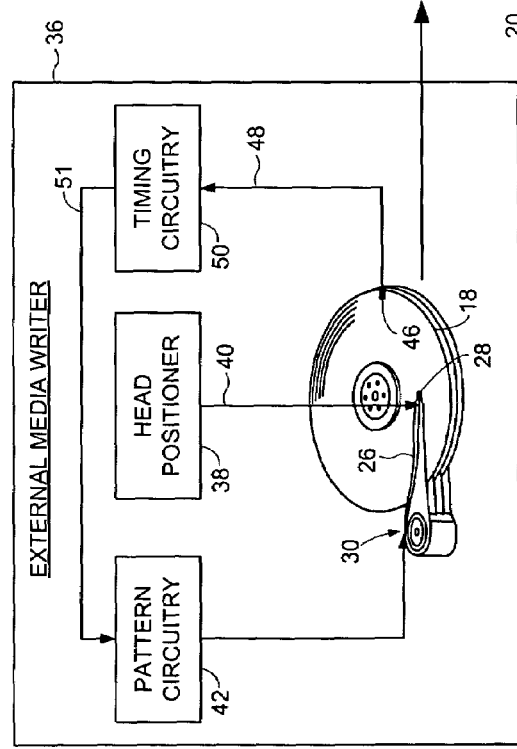

COMPENSATING FOR REPEATABLE PHASE ERROR WHEN SERVO WRITING A DISK DRIVE FROM SPIRAL TRACKS

BACKGROUND OF THE INVENTION

1. Field of the Invention

The present invention relates to disk drives. More particularly, the present invention relates to compensating for repeatable phase error when servo writing a disk drive from spiral tracks.

2. Description of the Prior Art

When manufacturing a disk drive, product servo sectors $2_0$-$2_N$ are written to a disk 4 which define a plurality of radially-spaced, concentric servo tracks 6 as shown in the prior art disk format of FIG. 1. Each product servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. During normal operation, the servo bursts 14 are processed by the disk drive in order to maintain a head over a centerline of a target track while writing or reading data. In the past, external servo writers have been used to write the product servo sectors $2_0$-$2_N$ to the disk surface during manufacturing. External servo writers employ extremely accurate head positioning mechanics, such as a laser interferometer, to ensure the product servo sectors $2_0$-$2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the product servo sectors independent of an external servo writer. For example, U.S. Pat. No. 5,668,679 teaches a disk drive which performs a self-servo writing operation by writing a plurality of spiral tracks to the disk which are then processed to write the product servo sectors along a circular path. Each spiral track is written to the disk as a high frequency signal (with missing bits), wherein the position error signal (PES) for tracking is generated relative to time shifts in the detected location of the spiral tracks. In addition, the '679 patent generates a servo write clock by synchronizing a phase-locked loop (PLL) to the missing bits in the spiral tracks, wherein the servo write clock is used to write the product servo sectors at the appropriate circular location as well as at the appropriate frequency. However, the '679 patent does not compensate for repeatable phase errors such as sinusoidal phase errors due, for example, to eccentricities caused by clamping the disk to the spindle motor after writing the spiral tracks using a media writer. The repeatable phase errors causes phase incoherency in the product servo sectors of adjacent tracks when servo writing the disk from the spiral tracks.

There is, therefore, a need to servo write a disk of a disk drive by synchronizing a servo write clock to spiral tracks prewritten on the disk, and compensating for repeatable phase errors.

SUMMARY OF THE INVENTION

An embodiment of the present invention comprises a method of writing product servo sectors on a disk of a disk drive. The disk drive comprises control circuitry and a head disk assembly (HDA) comprising the disk, an actuator arm, a head coupled to a distal end of the actuator arm, and a voice coil motor for rotating the actuator arm about a pivot to position the head radially over the disk. The disk comprises a plurality of spiral tracks, each spiral track comprises a high frequency signal interrupted periodically by a sync mark. The head internal to the disk drive is used to read the spiral tracks to generate a read signal, and the sync marks are detected from the read signal to generate a sync mark detect signal. A timing recovery measurement is generated in response to the sync mark detect signal, wherein the timing recovery measurement comprises a sinusoidal component. A timing compensation value is generated in response to the sync mark detect signal, wherein the timing compensation value estimates the sinusoidal component in the timing recovery measurement. A frequency control signal is generated in response to the timing recovery measurement and the timing compensation value, a servo write clock is generated in response to the frequency control signal, and the servo write clock and the head internal to the disk drive are used to write the product servo sectors to the disk.

In one embodiment, the spiral tracks are written on the disk using a media writer, and in one embodiment the timing compensation value estimates the sinusoidal component in the timing recovery measurement due to an eccentricity of the disk when installed into the HDA.

In another embodiment, the timing recovery measurement is generated by generating a coarse timing recovery measurement from the sync mark detect signal and a fine timing recovery measurement from the high frequency signal.

In yet another embodiment, generating the timing compensation value comprises adjusting coefficients $\{\hat{a}, \hat{b}\}$ of a sinusoid according to:

$$\hat{a}(k+1) = \hat{a}(k) - G^*e(k)^*\cos(2\pi k/N)$$

$$\hat{b}(k+1) = \hat{b}(k) - g^*e(k)^*\sin(2\pi k/N)$$

wherein G is a predetermined gain, e(k) is a timing error, and k is an index representing one of the spiral tracks. In one embodiment, the timing error e(k) is estimated by:

calculating an estimated sync mark interval (SMI) according to:

$$\text{EST\_SMI} = \text{RI} + \hat{a}^*\cos(2\pi k/n) + \hat{b}^*\sin(2\pi k/N)$$

wherein RI is a reference interval corresponding to a nominal SMI;

detecting an actual SMI by detecting an interval between the head passing over a first and second sync mark in the spiral tracks; and computing a difference between the estimated SMI and the detected actual SMI.

In another embodiment, the timing error e(k) is represented by the timing recovery measurement.

In yet another embodiment, the timing recovery measurement is combined with the timing compensation value to generate an adjusted timing recovery measurement, wherein the adjusted timing recovery measurement is filtered. In another embodiment, the timing recovery measurement is filtered to generate a filtered timing recovery measurement, wherein the filtered timing recovery measurement is combined with the timing compensation value.

Another embodiment of the present invention comprises a disk drive including a disk having a plurality of spiral tracks, wherein each spiral track comprises a high frequency signal interrupted periodically by a sync mark. A head internal to the disk drive is used to read the spiral tracks to generate a read signal, and the sync marks are detected from the read signal to generate a sync mark detect signal. A timing recovery measurement is generated in response to the sync mark detect signal, wherein the timing recovery measurement comprises a sinusoidal component. A timing compensation value is generated in response to the sync mark detect signal, wherein the timing compensation value estimates the sinusoidal component in the timing recovery measurement. A frequency control signal is generated in response to the timing recovery measurement and the timing compensation value, a servo write clock is generated in response to the frequency control signal, and the servo write clock and the head internal to the disk drive are used to write the product servo sectors to the disk.

BRIEF DESCRIPTION OF THE DRAWINGS

FIGS. 3A and 3B illustrate an embodiment of the present invention wherein an external media writer is used to write a plurality of spiral tracks to the disk for use in writing product servo sectors to the disk.

DESCRIPTION OF THE PREFERRED EMBODIMENTS

Figure 2:
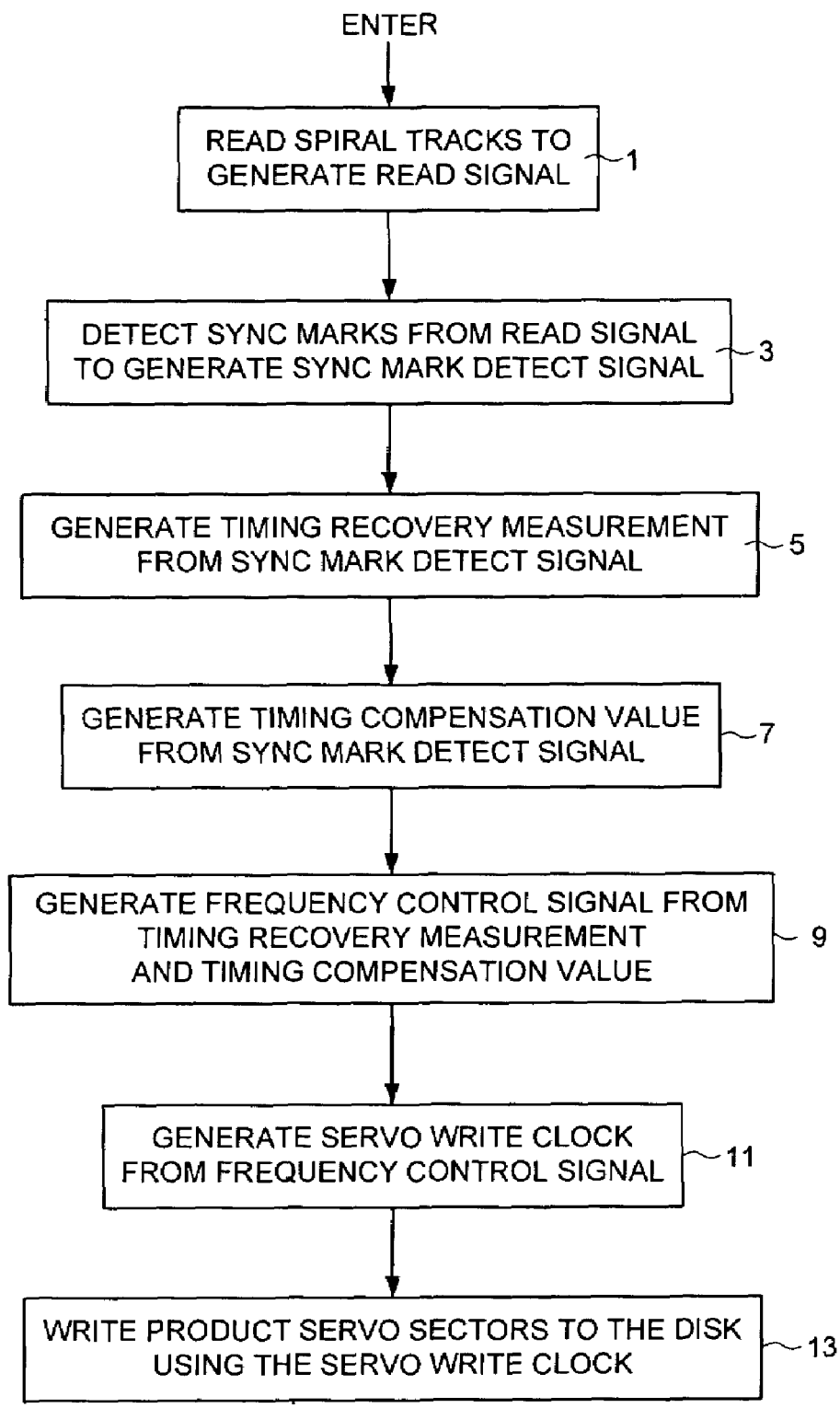
FIG. 2 is a flow diagram according to an embodiment of the present invention wherein a timing compensation value is generated which estimates a sinusoidal component in a timing recovery measurement used to synchronize a servo write clock.

FIG. 2 shows a flow diagram for writing product servo sectors on a disk of a disk drive according to an embodiment of the present invention. The disk drive comprises control circuitry and a head disk assembly (HDA) comprising the disk, an actuator arm, a head coupled to a distal end of the actuator arm, and a voice coil motor for rotating the actuator arm about a pivot to position the head radially over the disk. The disk comprises a plurality of spiral tracks, each spiral track comprises a high frequency signal interrupted periodically by a sync mark. At step 1 the head internal to the disk drive is used to read the spiral tracks to generate a read signal, and at step 3 the sync marks are detected from the read signal to generate a sync mark detect signal. At step 5 a timing recovery measurement is generated in response to the sync mark detect signal, wherein the timing recovery measurement comprises a sinusoidal component. At step 7 a timing compensation value is generated in response to the sync mark detect signal, wherein the timing compensation value estimates the sinusoidal component in the timing recovery measurement. At step 9 a frequency control signal is generated in response to the timing recovery measurement and the timing compensation value, at step 11 a servo write clock is generated in response to the frequency control signal, and at step 13 the servo write clock and the head internal to the disk drive are used to write the product servo sectors to the disk.

The spiral tracks may be written to the disk using any suitable technique, such as using an external media writer for writing the spiral tracks to the disk, or stamping the spiral tracks on the disk using magnetic printing techniques. FIGS. 3A and 3B show an embodiment wherein a plurality of spiral tracks $20_0$-$20_N$ are written to a disk 18 of a disk drive using an external media writer 36. The external media writer 36 comprises an actuator arm 26, a head 28 coupled to a distal end of the actuator arm 26, and a voice coil motor 30 for rotating the actuator arm 26 about a pivot to position the head 28 radially over the disk 18. In one embodiment, the actuator arm 26, head 28, and voice coil motor 30 are enclosed in the head disk assembly (HDA) of a disk drive manipulated by an external spiral servo writer. In an alternative embodiment, the actuator arm 26, head 28, and voice coil motor 30 are part of a media writer that writes the spiral tracks to the disk 18 before being inserted into the HDA of a disk drive.

In the embodiment of FIG. 3A, a write clock is synchronized to the rotation of the disk 18, and the plurality of spiral tracks $20_0$-$20_N$ are written on the disk 18 at a predetermined circular location determined from the write clock. Each spiral track $20_i$ comprises a high frequency signal 22 (FIG. 5B)

interrupted at a predetermined interval by a sync mark 24. The external media writer 36 comprises a head positioner 38 for actuating a head positioning pin 40 using sensitive positioning circuitry, such as a laser interferometer. Pattern circuitry 42 generates the data sequence written to the disk 18 for the spiral tracks $20_0$-$20_N$. The external media writer 36 comprises a clock head 46 for writing a clock track 44 (FIG. 3B) at an outer diameter of the disk 18. The clock head 46 then reads the clock track 44 to generate a clock signal 48 processed by timing recovery circuitry 50 to synchronize the write clock 51 for writing the spiral tracks $20_0$-$20_N$ to the disk 18. The timing recovery circuitry 50 enables the pattern circuitry 42 at the appropriate time relative to the write clock 51 so that the spiral tracks $20_0$-$20_N$ are written at the appropriate circular location. The timing recovery circuitry 50 also enables the pattern circuitry 42 relative to the write clock 51 to write the sync marks 24 (FIG. 5B) within the spiral tracks $20_0$-$20_N$ at the same circular location from the outer diameter to the inner diameter of the disk 18. As described below with reference to FIG. 6, the constant interval between sync marks 24 (independent of the radial location of the head 28) enables the servo write clock to maintain synchronization while writing the product servo sectors to the disk.

Figure 4:
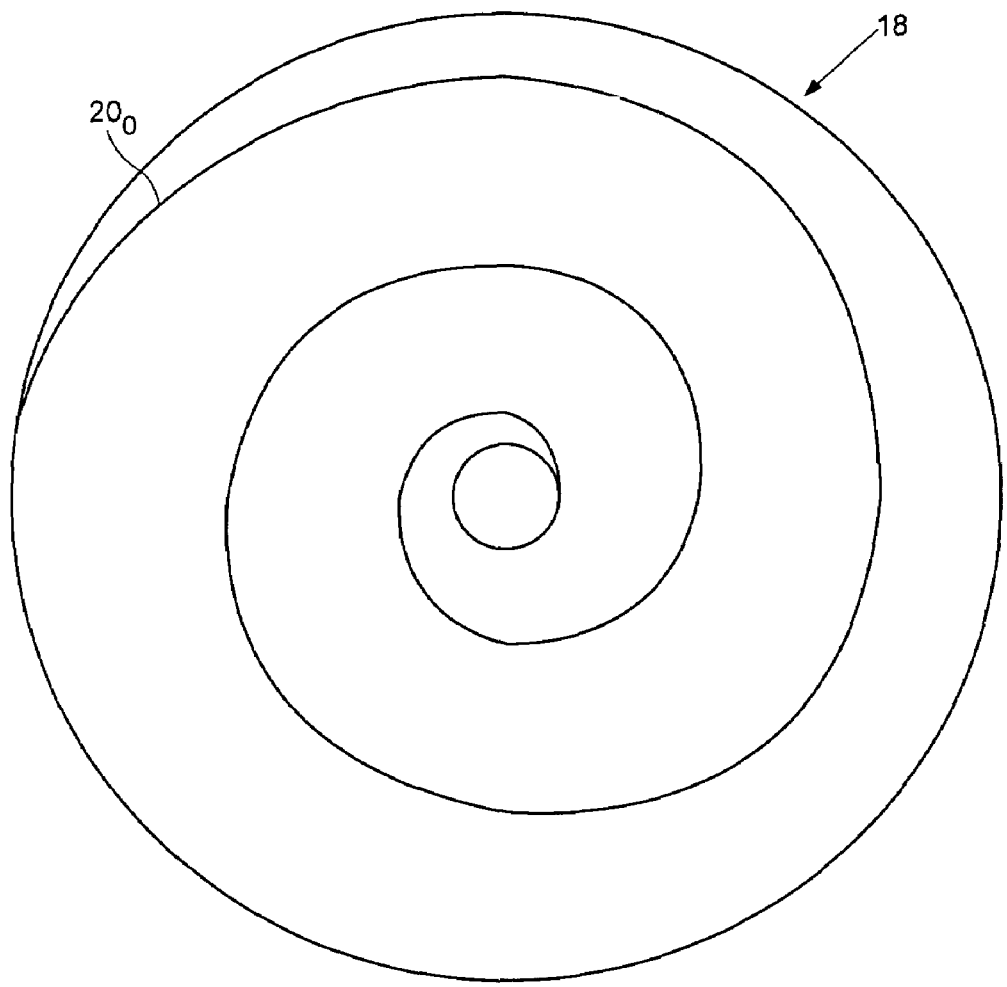
FIG. 4 illustrates an embodiment of the present invention wherein each spiral track is written over multiple revolutions of the disk.

In the embodiment of FIG. 3B, each spiral track $20_i$ is written over a partial revolution of the disk 18. In an alternative embodiment, each spiral track $20_i$ is written over one or more revolutions of the disk 18. FIG. 4 shows an embodiment wherein each spiral track $20_i$ is written over multiple revolutions of the disk 18.

Referring again to the embodiment of FIG. 3A, after the external media writer 36 writes the spiral tracks $20_0$-$20_N$ to the disk 18, the head positioning pin 40 and clock head 46 are removed from the HDA 32 and the product servo sectors are written to the disk 18. In one embodiment, the control circuitry 34 within the disk drive 16 is used to process the spiral tracks $20_0$-$20_N$ in order to write the product servo sectors to the disk 18. In an alternative embodiment described below with reference to FIGS. 15 and 16, an external product servo writer is used to process the spiral tracks $20_0$-$20_N$ in order to write the product servo sectors to the disk 18 during a "fill operation".

FIG. 5B illustrates an "eye" pattern in the read signal that is generated when the head 28 passes over a spiral track 20. The read signal representing the spiral track comprises high frequency transitions 22 interrupted by sync marks 24. When the head 28 moves in the radial direction, the eye pattern will shift (left or right) while the sync marks 24 remain fixed. The shift in the eye pattern (detected from the high frequency signal 22) relative to the sync marks 24 provides the off-track information (position error signal or PES) for servoing the head 28.

Figure 5A:
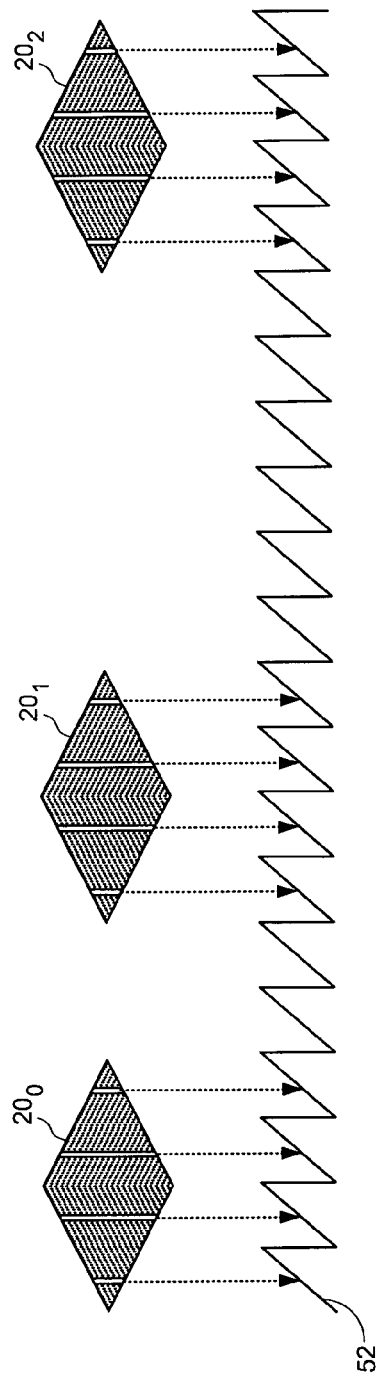
FIG. 5A shows an embodiment of the present invention wherein a servo write clock is synchronized by clocking a modulo-N counter relative to when the sync marks in the spiral tracks are detected.
Figure 5B:
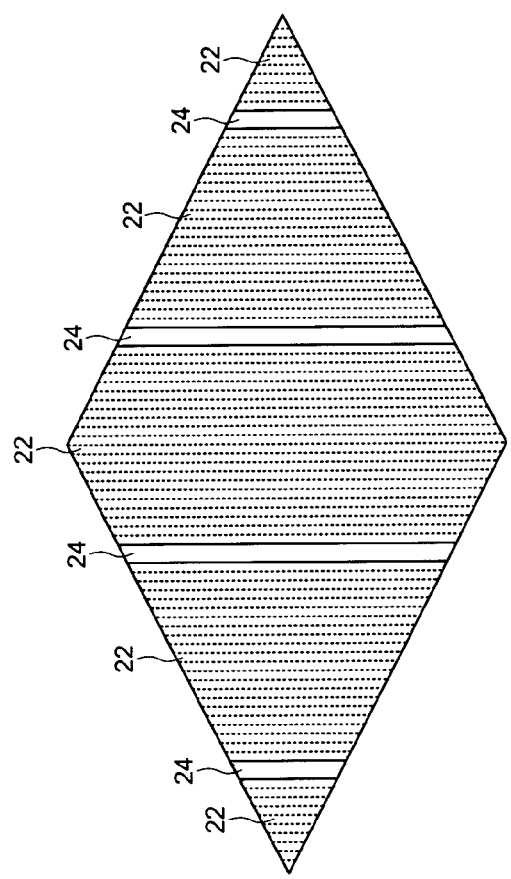
FIG. 5B shows an eye pattern generated by reading the spiral track, including the sync marks in the spiral track.

FIG. 5A shows an embodiment of the present invention wherein a saw-tooth waveform 52 is generated by clocking a modulo-N counter with the servo write clock, wherein the frequency of the servo write clock is adjusted until the sync marks 24 in the spiral tracks $20_0$-$20_N$ are detected at a target modulo-N count value. The servo write clock may be generated using any suitable circuitry, such as a phase locked loop (PLL). As each sync mark 24 in the spiral tracks $20_0$-$20_N$ is detected, the value of the modulo-N counter represents the phase error for adjusting the PLL. In one embodiment, the PLL is updated when any one of the sync marks 24 within the eye pattern is detected. In this manner the multiple sync marks 24 in each eye pattern (each spiral track crossing) provides redundancy so that the PLL is still updated if one or more of the sync marks 24 are missed due to noise in the read signal. Once the sync marks 24 are detected at the target modulo-N count values, the servo write clock is coarsely locked to the desired frequency for writing the product servo sectors to the disk 18.

Figure 1:
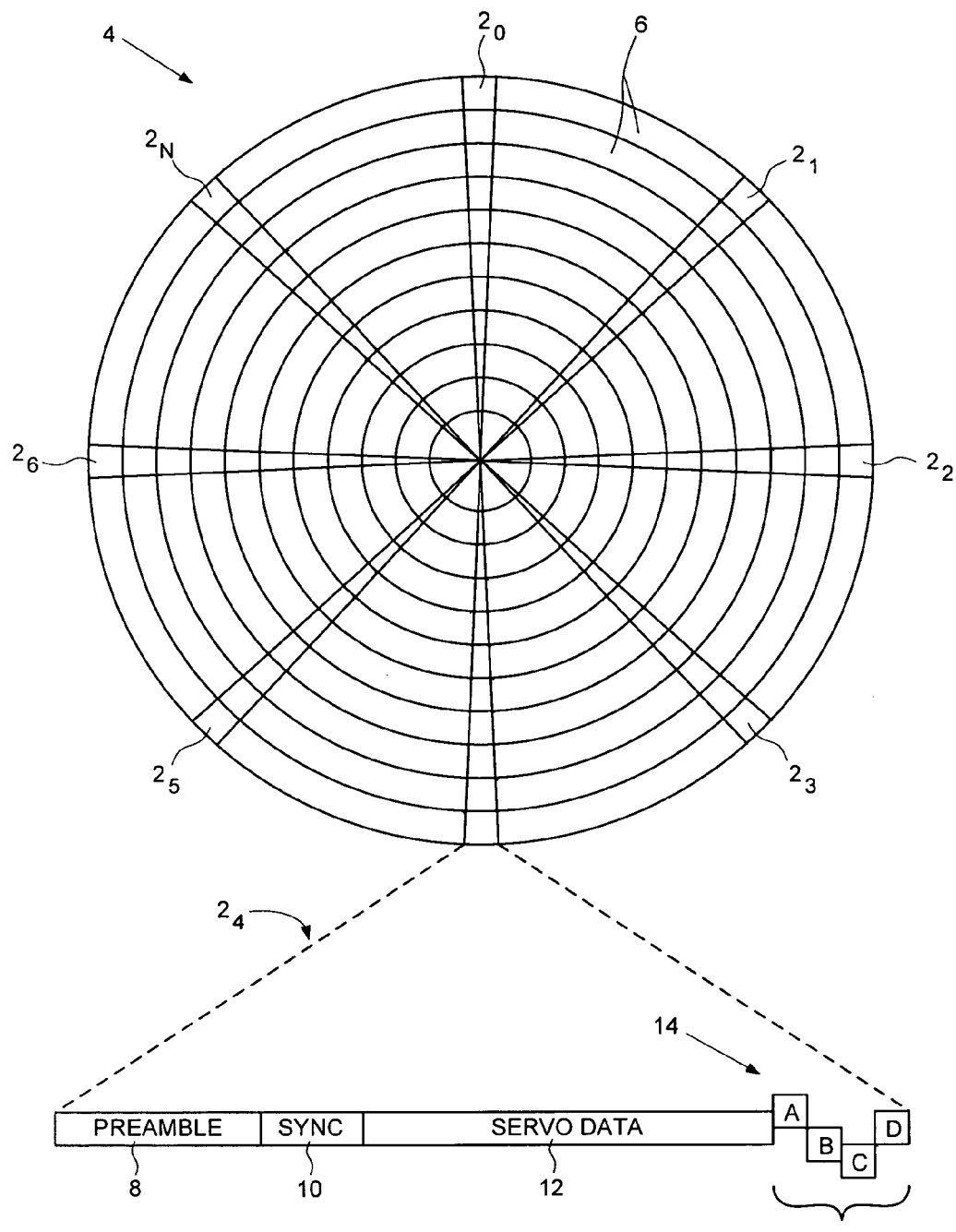
FIG. 1 shows a prior art disk format comprising a plurality of servo tracks defined by product servo sectors forming servo wedges.

The sync marks 24 in the spiral tracks $20_0$-$20_N$ may comprise any suitable pattern, and in one embodiment, a pattern that is substantially shorter than the sync mark 10 in the conventional product servo sectors 2 of FIG. 1. A shorter sync mark 24 allows the spiral tracks $20_0$-$20_N$ to be written to the disk 18 using a steeper slope (by moving the head faster from the outer diameter to the inner diameter of the disk 18) which reduces the time required to write each spiral track $20_0$-$20_N$.

In one embodiment, the servo write clock is further synchronized by generating a timing recovery measurement from the high frequency signal 22 between the sync marks 24 in the spiral tracks $20_0$-$20_N$. Synchronizing the servo write clock to the high frequency signal 22 helps maintain proper radial alignment (phase coherency) of the Gray coded track addresses in the product servo sectors. The timing recovery measurement may be generated in any suitable manner. In one embodiment, the servo write clock is used to sample the high frequency signal 22 and the signal sample values are processed to generate the timing recovery measurement. The timing recovery measurement adjusts the phase of the servo write clock (PLL) so that the high frequency signal 22 is sampled synchronously. In this manner, the sync marks 24 provide a coarse timing recovery measurement and the high frequency signal 22 provides a fine timing recovery measurement for maintaining synchronization of the servo write clock.

Figure 6:
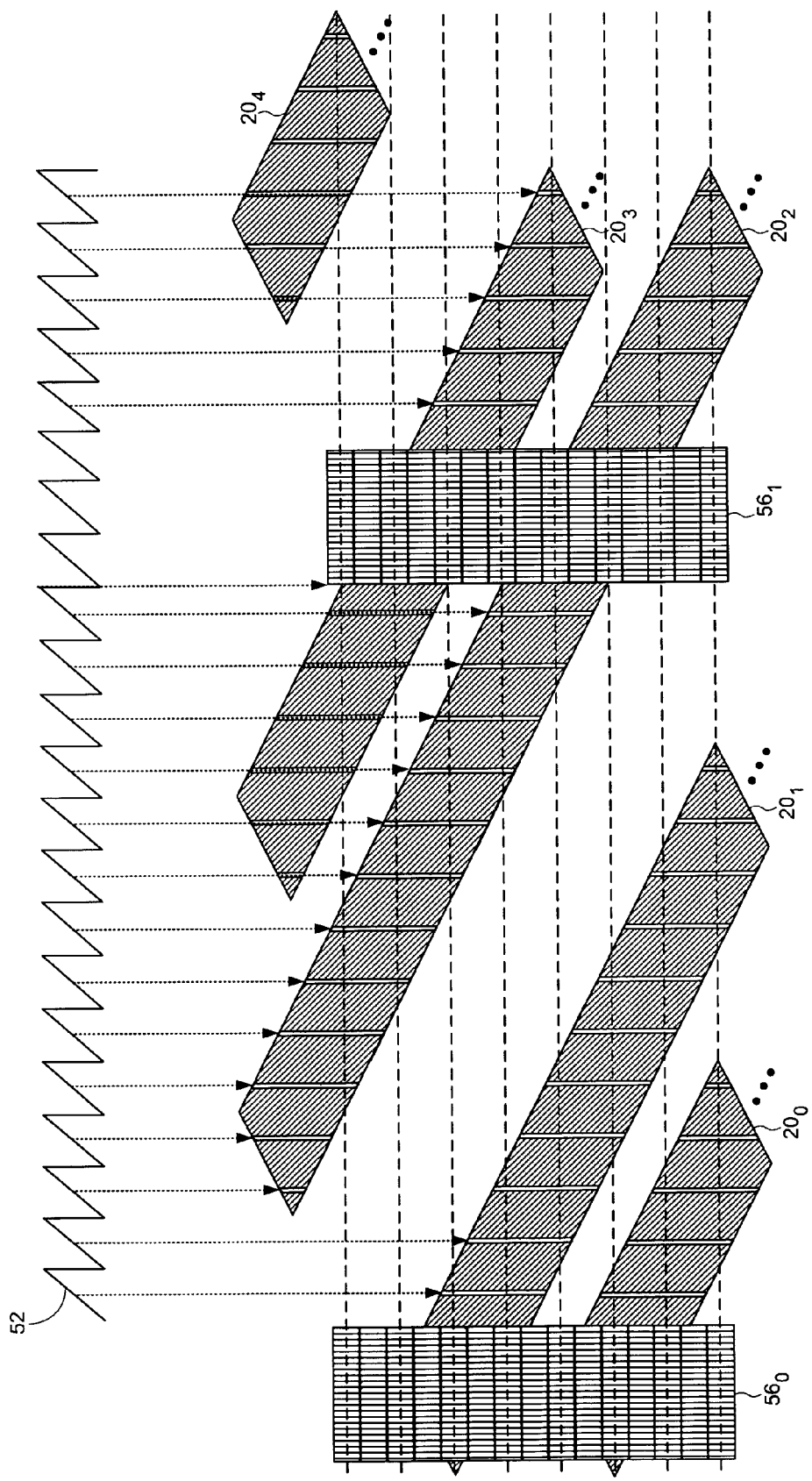
FIG. 6 illustrates writing of product servo sectors using a servo write clock generated from reading the spiral tracks.

FIG. 6 illustrates how the product servo sectors $56_0$-$56_N$ are written to the disk 18 after synchronizing the servo write clock in response to the high frequency signal 22 and the sync marks 24 in the spiral tracks $20_0$-$20_N$. In the embodiment of FIG. 6, the dashed lines represent the centerlines of the data tracks. The sync marks in the spiral tracks $20_0$-$20_N$ are written so that there is a shift of two sync marks 24 in the eye pattern (FIG. 5B) between data tracks. In an alternative embodiment, the sync marks 24 in the spiral tracks $20_0$-$20_N$ are written so that there is a shift of N sync marks in the eye pattern between data tracks. In the embodiment of FIG. 6, each spiral track $20_0$-$20_N$ is wider than a data track, however, in an alternative embodiment the width of each spiral track $20_0$-$20_N$ is less than or proximate the width of a data track.

The PES for maintaining the head 28 along a servo track (tracking) may be generated from the spiral tracks $20_0$-$20_N$ in any suitable manner. In one embodiment, the PES is generated by detecting the eye pattern in FIG. 5B using an envelope detector and detecting a shift in the envelope relative to the sync marks 24. In one embodiment, the envelope is detected by integrating the high frequency signal 22 and detecting a shift in the resulting ramp signal. In an alternative embodiment, the high frequency signal 22 between the sync marks 24 in the spiral tracks are demodulated as servo bursts and the PES generated by comparing the servo bursts in a similar manner as the servo bursts 14 in the product servo sectors (FIG. 1).

Once the head 28 is tracking on a servo track, the product servo sectors $56_0$-$56_N$ are written to the disk using the servo write clock. Write circuitry is enabled when the modulo-N counter reaches a predetermined value, wherein the servo write clock clocks the write circuitry to write the product servo sector 56 to the disk. The spiral tracks $20_0$-$20_N$ on the disk are processed in an interleaved manner to account for the product servo sectors $56_0$-$56_N$ overwriting a spiral track. For example, when writing the product servo sectors $56_1$ to the disk, spiral track $20_2$ is processed initially to generate the PES tracking error and the timing recovery measurement. When the product servo sectors $56_1$ begin to overwrite spiral track $20_2$, spiral track $20_3$ is processed to generate the PES tracking error and the timing recovery measurement.

Figure 7:
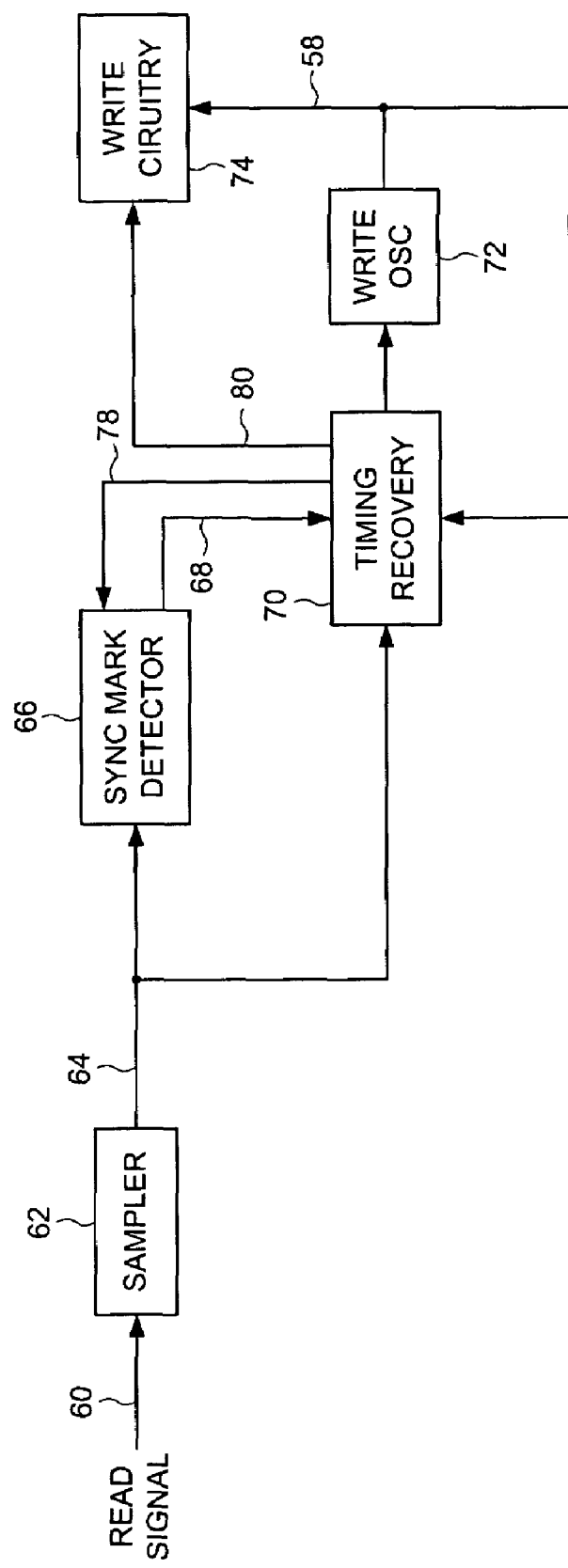
FIG. 7 shows circuitry according to an embodiment of the present invention for generating the servo write clock.

FIG. 7 shows details of control circuitry for synchronizing the servo write clock 58 according to an embodiment of the present invention. The read signal 60 emanating from the head 28 is sampled 62, and the read signal sample values 64 are processed by a sync mark detector 66 for detecting the sync marks 24 in the spiral tracks $20_0$-$20_N$. The sync mark detector 66 generates a sync mark detect signal 68 applied to a timing recovery circuit 70. The timing recovery circuit 70 processes the sync mark detect signal 68 to generate a coarse timing recovery measurement, and the read signal sample values 64 representing the high frequency signal 22 in the spiral tracks $20_0$-$20_N$ to generate a fine timing recovery measurement. The coarse and fine timing recovery measurements are combined to generate a frequency control signal applied to a write oscillator 72 which outputs the servo write clock 58. The servo write clock 58 clocks operation of write circuitry 74 for writing the product servo sectors $56_0$-$56_N$ to the disk 18. The servo write clock 58 is also fed back into the timing recovery circuit 70 and used to generate the coarse timing recovery measurement. The timing recovery circuit 70 generates a sync mark detection window over line 78 for enabling the sync mark detector 66 during a window where a sync mark 24 is expected to occur. The timing recovery circuit 70 also generates a control signal over line 80 to enable the write circuitry 74 to begin writing a product servo sector at the appropriate time.

Figure 8:
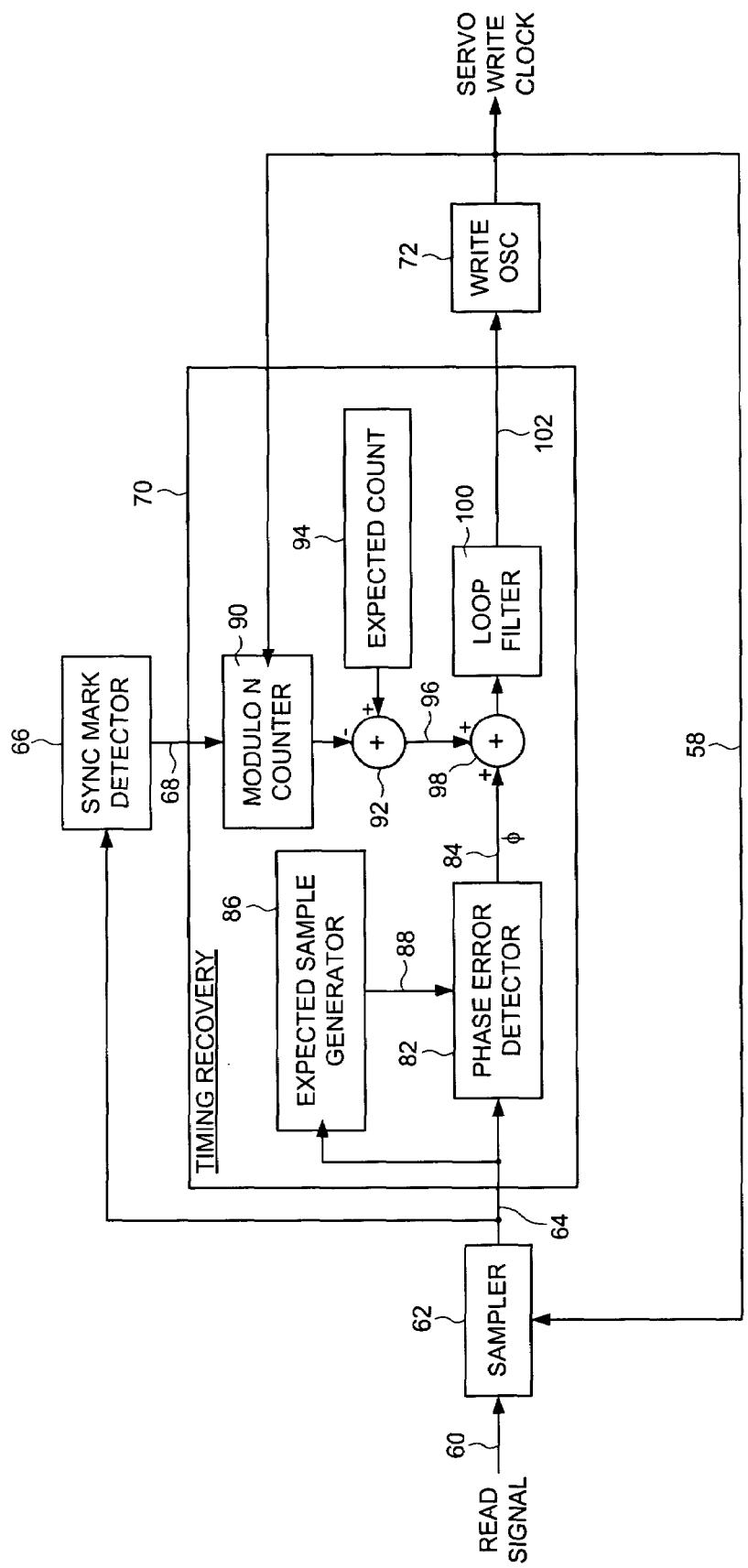
FIG. 8 shows an embodiment of the timing recovery circuitry wherein a fine phase error is generated from read signal sample values and expected sample values, and the servo write clock is used to synchronously sample the read signal.
Figure 9:
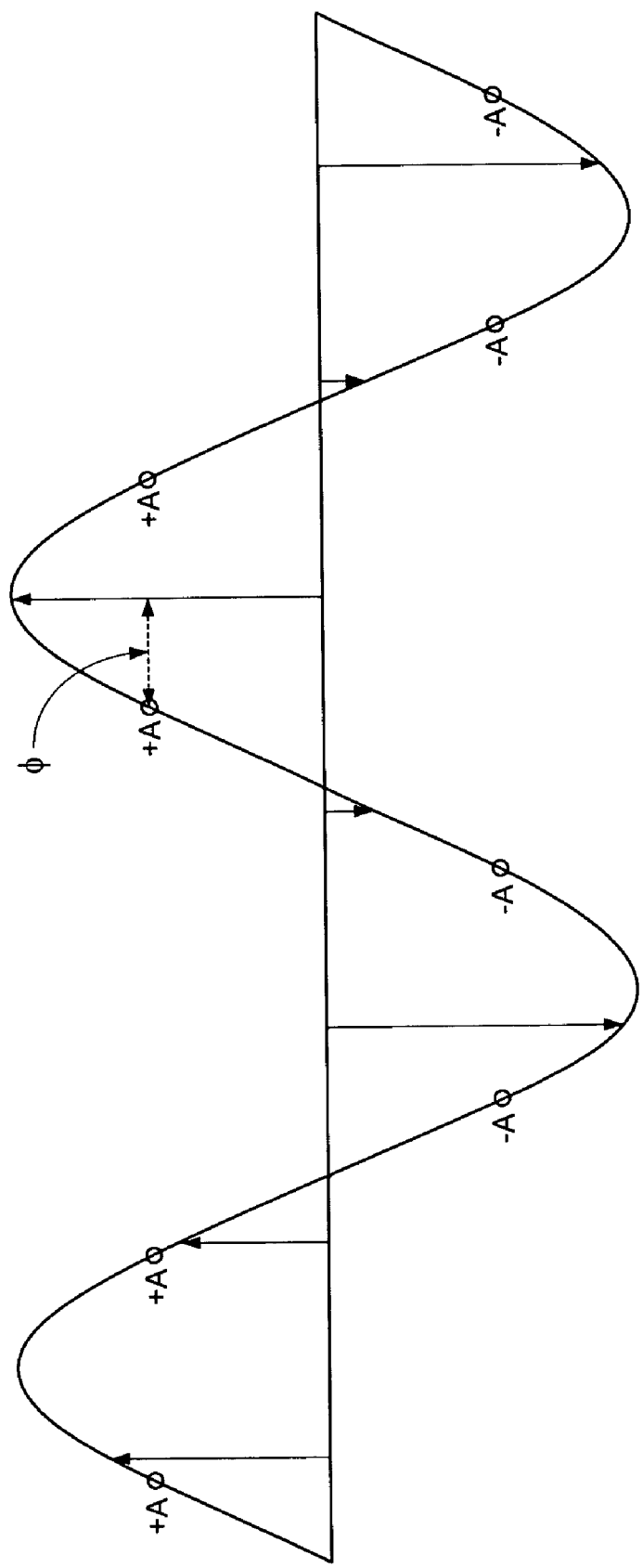
FIG. 9 illustrates the read signal sample values, the expected sample values, and the corresponding phase error.

FIG. 8 shows details of a suitable timing recovery circuit 70 according to an embodiment of the present invention wherein the servo write clock 58 is used to synchronously sample 62 the read signal 60 to generate synchronous read signal sample values 64. A phase error detector 82 detects a phase error $\phi$ 84 between the read signal sample values 64 (arrows in FIG. 9) and expected sample values 88 (circles in FIG. 9). An expected sample generator 86 generates the expected sample values 88 input into the phase error detector 82. The phase error detector 82 generates the phase error $\phi$ 84 by implementing a suitable stochastic gradient equation. In one embodiment, the expected sample generator 86 processes the read signal samples 64 to initialize a state machine which then outputs the expected sample values 88. Referring to FIG. 9, after being initialized the state machine generates the sequence (. . . +A,+A,−A,−A,+A,+A,−A,−A . . . ). In one embodiment, a high bandwidth gain loop maintains the gain of the read signal sample values 64 at a target level to compensate for the amplitude variation in the read signal 60 (the eye pattern of FIG. 5B) as the head 28 passes over a spiral track 20. In an alternative embodiment, the amplitude A of the expected sample values 88 is adjusted relative to the amplitude of the read signal 60. For example, an envelope detector can track the amplitude of the eye pattern (FIG. 5B) and then adjust the amplitude A of the expected sample values 88 accordingly. However, any suitable technique may be used to generate the fine timing recovery measurement (phase error $\phi$) from the high frequency signal 22 in the spiral tracks 20. In one embodiment, a suitable trigonometric identity is employed to generate the phase error $\phi$ in a manner that is substantially independent of the amplitude variations in the read signal 60.

The servo write clock 58 also clocks a modulo N counter 90 (FIG. 8). When the sync mark detector 66 detects a sync mark 24 in a spiral track 20, the content of the modulo N counter 90 is subtracted 92 from an expected count value 94 to generate the coarse timing recovery measurement 96. The coarse timing recovery measurement 96 and the fine timing recovery measurement (phase error $\phi$ 84) are combined 98 and filtered by a loop filter 100. The output of the loop filter 100 is a frequency control signal 102 applied to the write oscillator 72 in order to synchronize the servo write clock 58.

Figure 10:
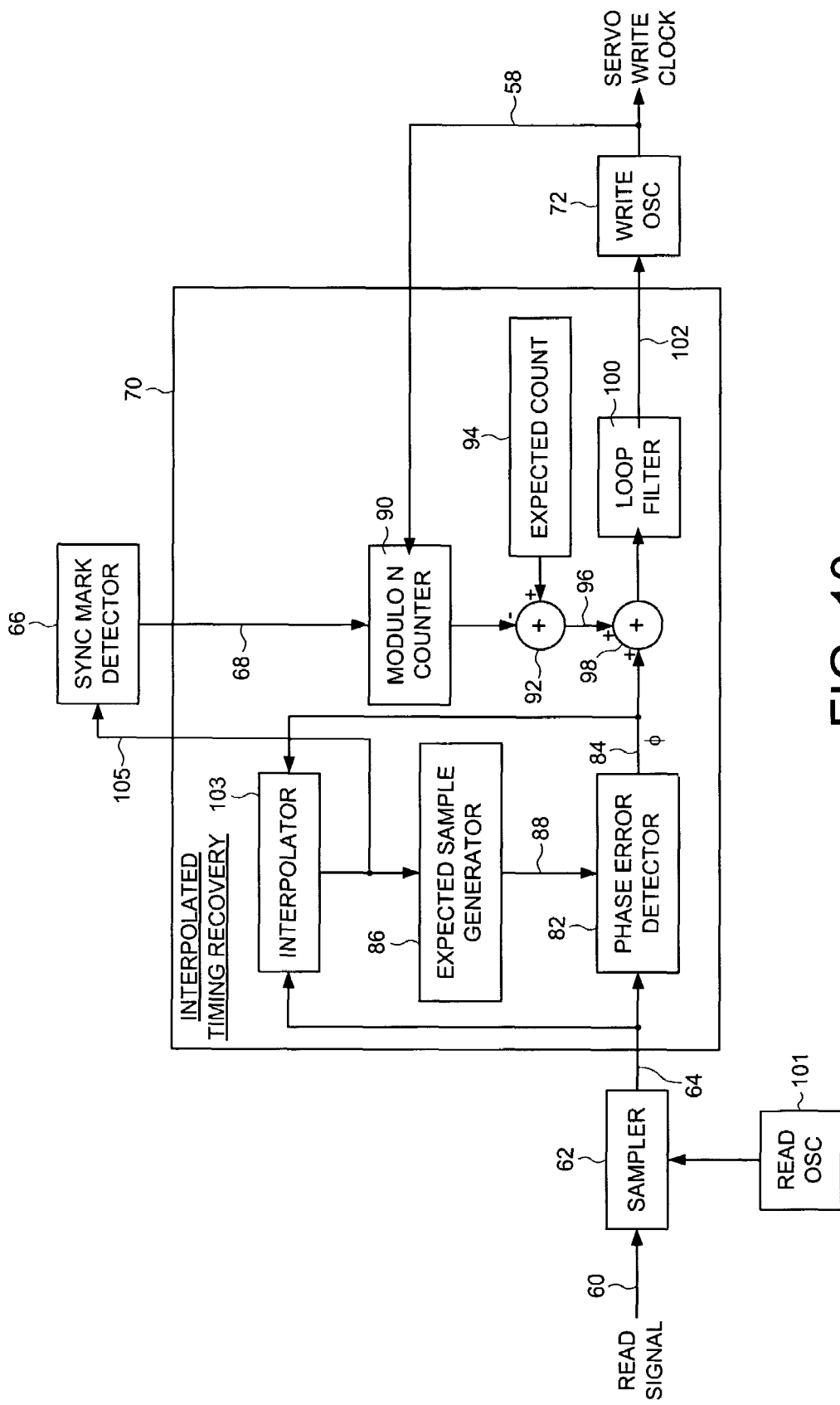
FIG. 10 shows an alternative embodiment wherein the timing recovery circuitry comprises an interpolator and a read oscillator is used to sample the read signal.

FIG. 10 shows details of a timing recovery circuit 70 according to an alternative embodiment of the present invention employing interpolated timing recovery (ITR). A read oscillator 101 samples 62 the reads signal 60 at a constant frequency to generate asynchronous sample values 64. A phase error detector 82 generates a phase error $\phi$ 84 between the expected sample values 88 and the asynchronous sample values 64. An interpolator 103 interpolates the asynchronous sample values 64 using the phase error $\phi$ 84 to generate synchronous sample values 105 processed by the sync mark detector 66 and the expected sample value generator 86. The interpolator 103 may employ any suitable circuitry, and in one embodiment implements a finite impulse response filter with variable coefficients for performing the interpolation. The remaining components in the timing recovery circuit 70 of FIG. 10 operate as described above with reference to FIG. 8 to generate a frequency control signal 102 applied to the write oscillator 72 in order to synchronize the servo write clock 58. In one embodiment, the read oscillator 101 and the write oscillator 72 are implemented on the same substrate so that they exhibit substantially the same center frequency and temperature drift.

Figure 11:
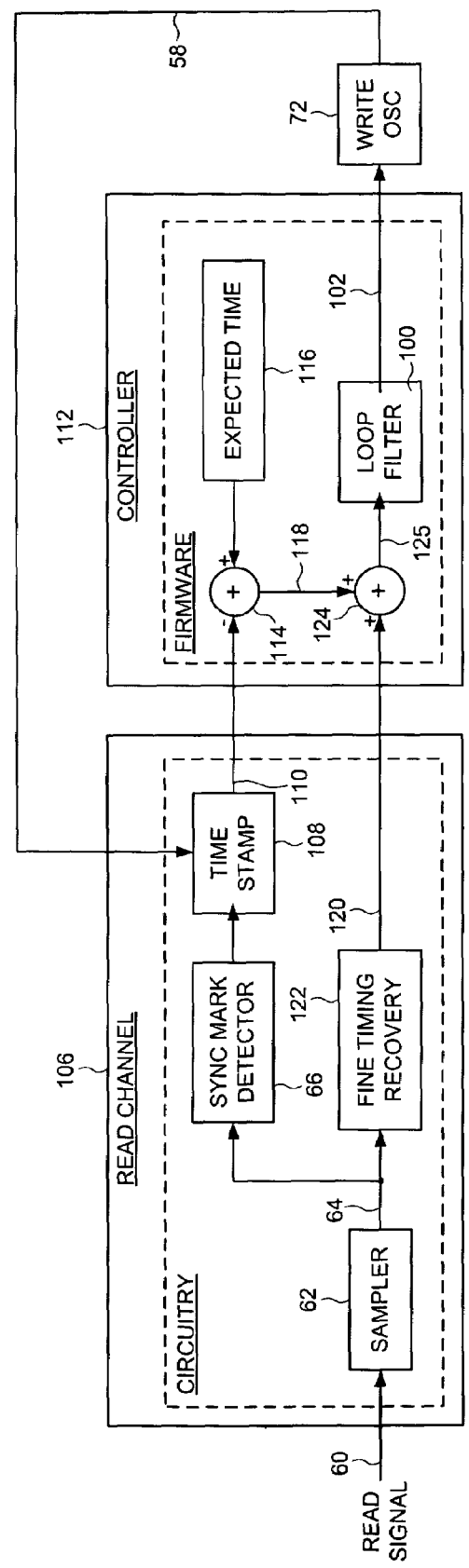
FIG. 11 shows an embodiment of the present invention wherein the sync mark detector is implemented in a read channel integrated circuit and a time-stamp sync mark detect signal is transmitted to a controller for processing in firmware to generate the coarse timing recovery measurement.

FIG. 11 shows an embodiment of the present invention wherein a read channel integrated circuit 106 comprises circuitry for implementing the sync mark detector 66 and time-stamp circuitry 108 for generating a time-stamped sync mark detect signal 110, wherein the time-stamped sync mark detect signal 110 represents a time when a sync mark in a spiral track was detected relative to the servo write clock 58. In the embodiment shown in FIG. 8, the time-stamp circuitry 108 comprises the modulo-N counter 90 wherein the time-stamp sync mark detect signal 110 is the value of the modulo-N counter 90 when a sync mark is detected. The time-stamped sync mark detect signal 110 is processed in firmware executed by a controller 112. The firmware computes a difference 114 between the time-stamped sync mark detect signal 110 and an expected time 116 to thereby generate a coarse timing recovery measurement 118 used to synchronize the servo write clock 58. In the embodiment of FIG. 8, the expected time 116 comprises a table of expected module-N count values corresponding to the expected values of the modulo-N counter 90 at each sync mark. The write oscillator 72 is shown as a separate component in the embodiment of FIG. 11; however, in one embodiment the write oscillator 72 is integrated into the read channel 106 or the controller 112.

The controller 112 also receives fine timing recovery information 120 generated by fine timing recovery circuitry 122 within the read channel 106. In the embodiment of FIG. 8, the fine timing recovery information 122 comprises the phase error $\phi$ 84 between the read signal sample values 64 (arrows in FIG. 9) and expected sample values 88 (circles in FIG. 9). The phase error $\phi$ 84 received by the controller 112 is combined 124 with the coarse timing recovery measurement 118 to generate a composite timing recovery measurement 125 filtered by loop filter 100 implemented in firmware.

Computing the coarse timing recovery measurement 118 in firmware increases the flexibility of the timing recovery algorithm while decreasing the cost and complexity of the circuitry employed in the read channel 106. In addition, implementing the loop filter 100 in firmware allows for more sophisticated (e.g., non-linear) operations to account for anomalies in the coarse timing recovery measurement 118 (such as large transients due to media defects). Yet further advantages realized by implementing timing recovery in firmware include computing (at least partially) the fine timing recovery measurement in firmware as well as a timing compensation value to compensate for repeatable phase error in the composite timing recovery measurement 125.

Figure 12:
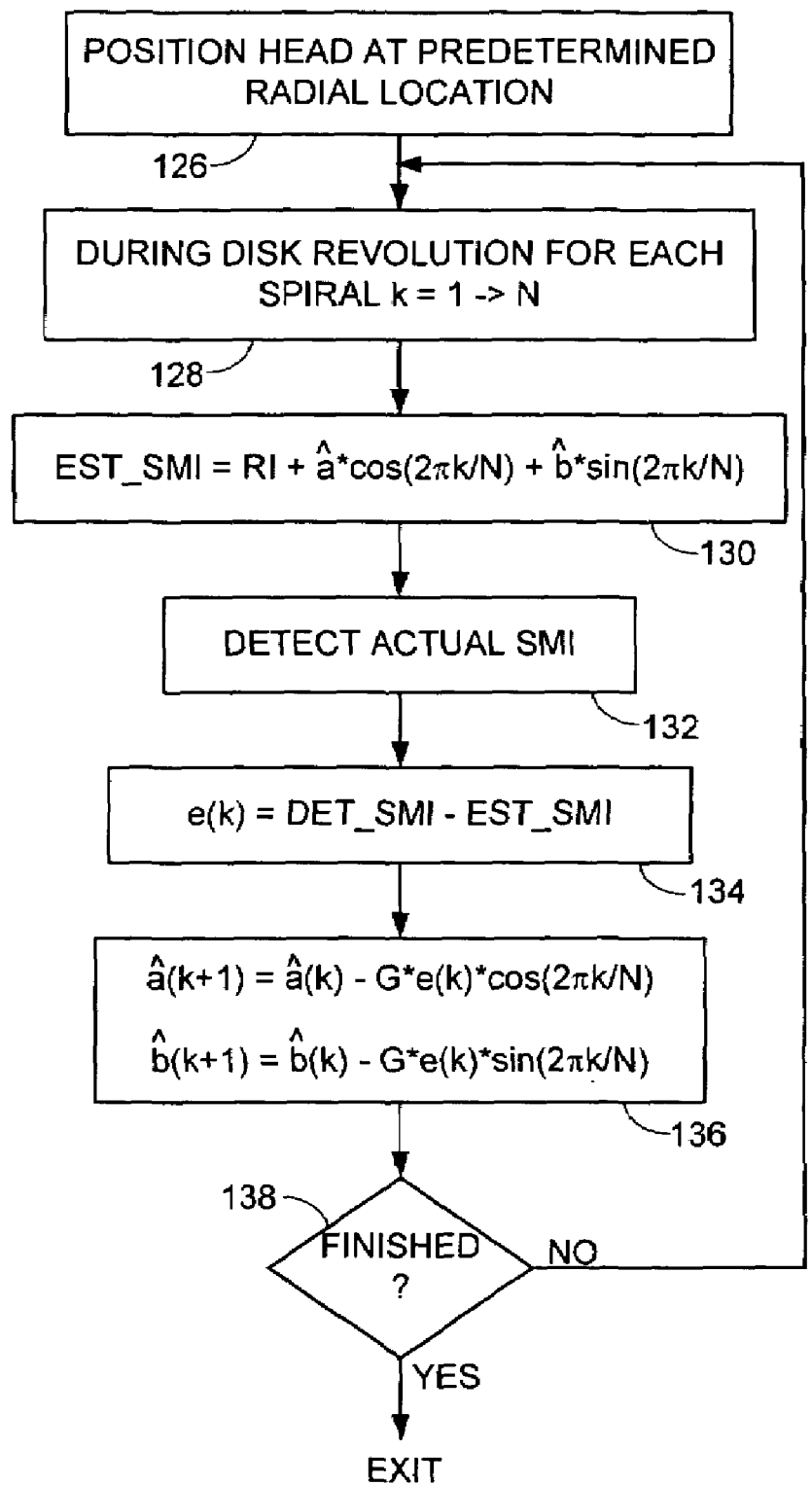
FIG. 12 is a flow diagram according to an embodiment of the present invention for generating timing compensation values that estimate a sinusoidal component of the timing recovery measurement by adapting coefficients of a sinusoid in response to the sync marks recorded in the spiral tracks.

FIG. 12 is a flow diagram according to an embodiment for generating the timing compensation values that estimate a sinusoidal component in the composite timing recovery measurement 125 due, for example, to a non-centric alignment of the disk when clamped to the spindle motor after using a media writer to write the spiral tracks to the disk. At step 126 the head is positioned at a predetermined radial location, such as a predetermined servo track by servoing on the spiral tracks, or pressing the actuator arm 26 against a crash stop to position the head over an outer diameter of the disk. As the disk rotates at step 128 and the head passes over each spiral k, at step 130 an estimated sync mark interval (SMI) is computed according to:

$$EST\_SMI = RI + \hat{a} * \cos(2\pi k/N) + \hat{b} * \sin(2\pi k/N) \quad (1)$$

wherein RI is a reference interval corresponding to a nominal SMI, and $\{\hat{a},\hat{b}\}$ are adjustable coefficients. At step 132 an actual SMI is generated by detecting an interval between the head passing over a first and second sync mark in the spiral tracks. At step 134 a timing error e(k) is estimated as a difference between the estimated SMI and the detected actual SMI. At step 136 the coefficients $\{\hat{a},\hat{b}\}$ for generating the estimated WTP are adjusted according to:

$$\hat{a}(k+1) = \hat{a}(k) - G*e(k)*\cos(2\pi k/N) \; \hat{b}(k+1) = \hat{b}(k) - G*e(k)*\sin(2\pi k/N) \quad (2)$$

wherein G is a predetermined gain. At step 138 the above steps are repeated at least once, for example, until the timing error e(k) falls below a predetermined threshold. The timing compensation values that estimate the sinusoidal component due to the eccentricity are then generated according to:

$$\hat{a} * \cos(2\pi k/N) + \hat{b} * \sin(2\pi k/N) \quad (3)$$

Figure 13A:
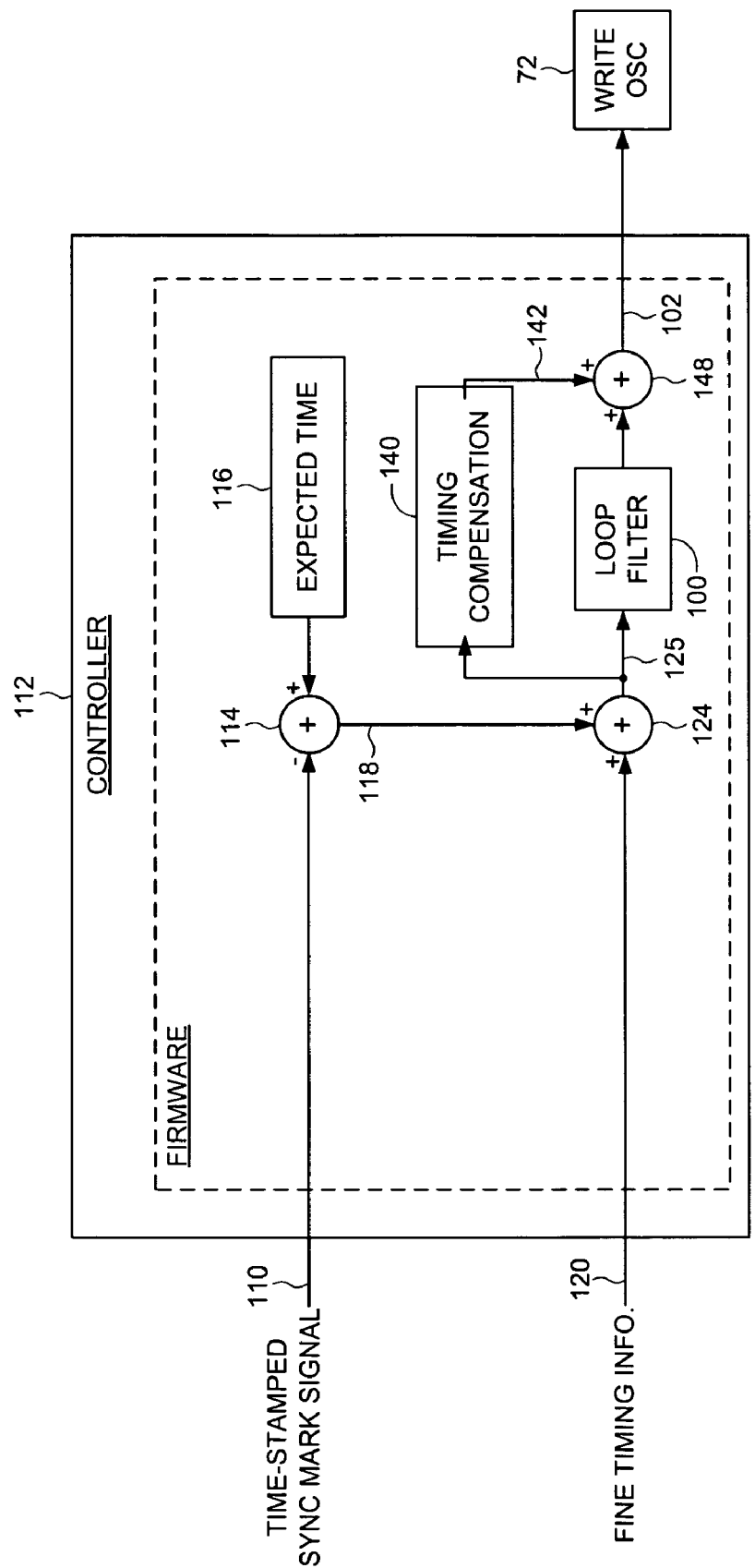
FIG. 13A shows an embodiment of the present invention wherein the controller comprises firmware for generating timing compensation values used to follow the sinusoidal component in the timing recovery measurement.

In the above described embodiment of FIG. 12, the coefficients $\{\hat{a},\hat{b}\}$ are adjusted open loop (i.e., without using the timing compensation values in the timing recovery circuit) until the error e(k) falls below a predetermined threshold, and then the timing compensation values generated according to equation (3) are used closed loop in the timing recovery circuit. In an alternative embodiment, the coefficients $\{\hat{a},\hat{b}\}$ are adjusted closed loop with the error e(k) in equation (2) represented as the composite timing recovery measurement 125. An example of this embodiment is shown in FIG. 13A, wherein a timing compensation circuit 140 generates the timing compensation values 142 by adjusting the coefficients $\{\hat{a},\hat{b}\}$ closed loop according to equation (2) until the composite timing recovery measurement 125 (error e(k)) falls below a predetermined threshold. The timing compensation values 142 are generated according to equation (3) and combined at adder 148 with the output of the loop filter 100 so that the PLL effectively follows the sinusoidal component of the timing recovery measurement due to the eccentricity of the disk. Thus, the servo write clock is adjusted in order to write the product servo sectors at a substantially constant linear bit density around the circumference of the disk.

Figure 13B:
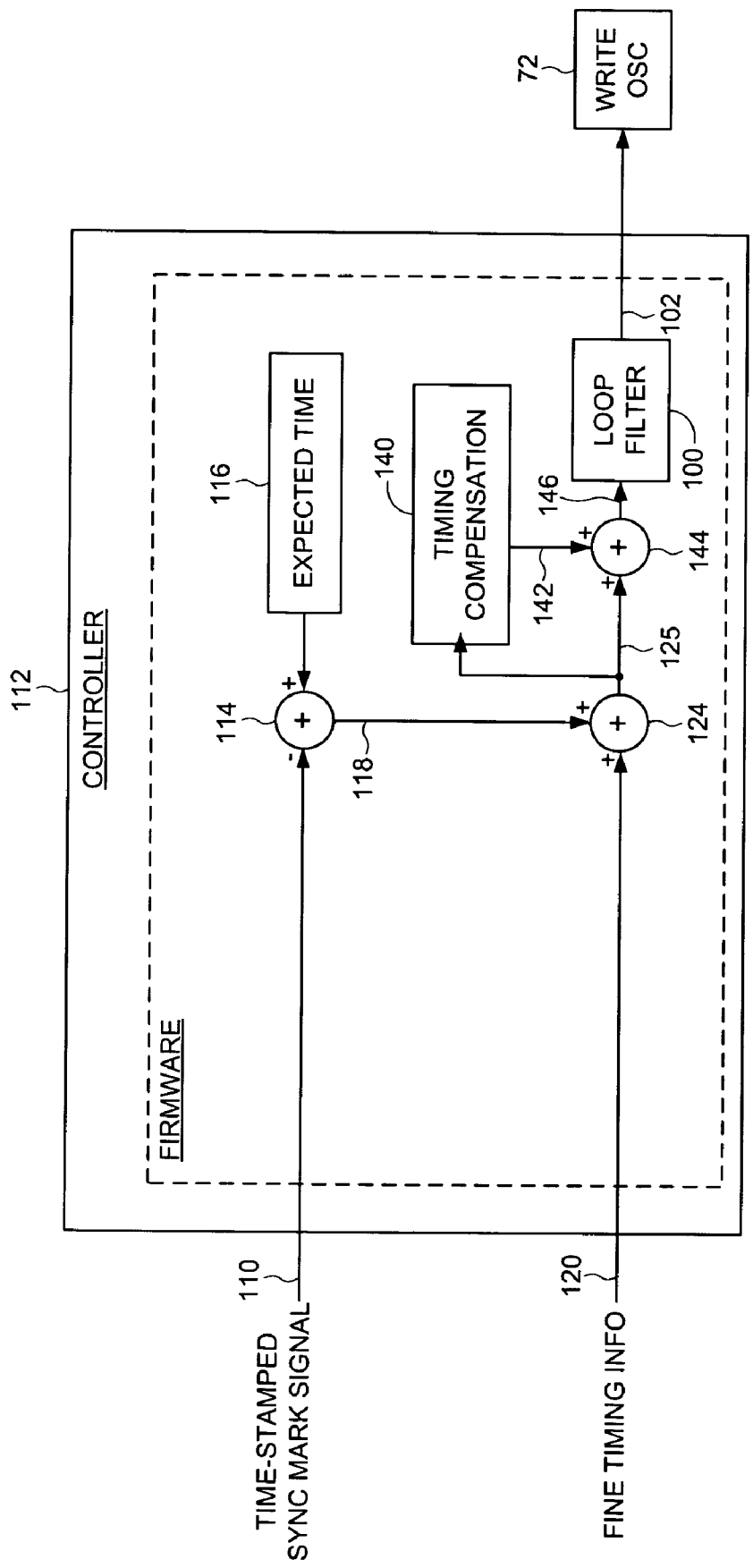
FIG. 13B shows an embodiment of the present invention wherein the controller comprises firmware for generating timing compensation values used to cancel the sinusoidal component in the timing recovery measurement.

In an alternative embodiment shown in FIG. 13B, the timing compensation values 142 are combined at adder 144 with the composite timing recovery measurement 125 to generate an adjusted timing recovery measurement 146. The loop filter 100 filters the adjusted timing recovery measurement 146 to generate the frequency control signal 102 applied to the write oscillator 72. In this embodiment, the timing compensation values 142 effectively cancel the sinusoidal component of the control signal 102 due to the eccentricity of the disk such that the product servo sectors are written at a varying linear bit density depending on the disk angle since the velocity of the disk changes due to the eccentricity. However, the phase coherency of the servo data from track to track is substantially preserved whether following or canceling the sinusoidal component.

Figure 14:
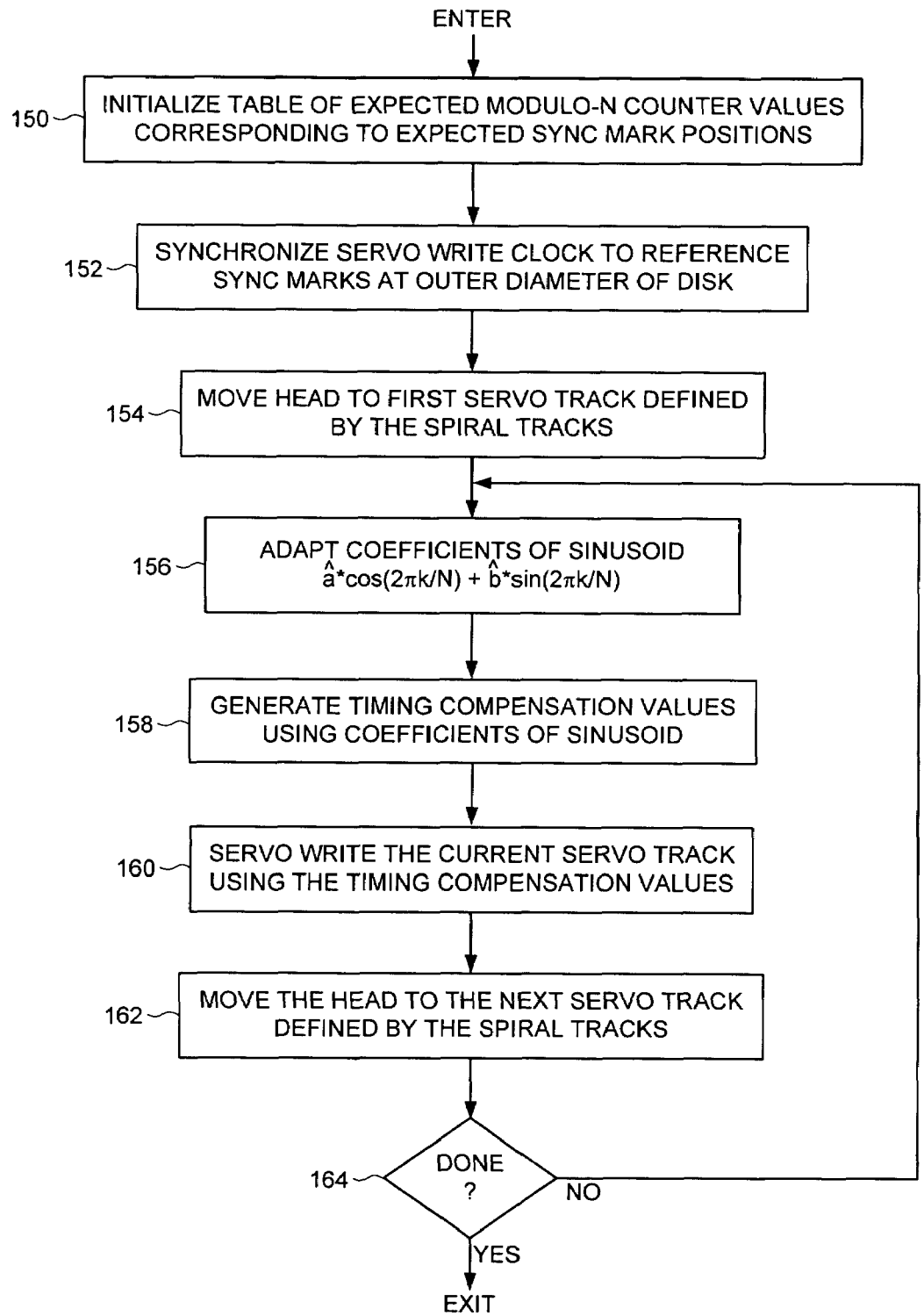
FIG. 14 is a flow diagram according to an embodiment of the present invention wherein the timing compensation values are generated prior to writing the product servo sectors to each servo track.

In one embodiment, the timing compensation values are generated for one radial location of the head (e.g., at the outer diameter), and then used to generate the frequency control signal while writing the product servo sectors across the disk radius. In an alternative embodiment, the timing compensation values are generated at multiple radial locations (e.g., multiple zones), and in yet another embodiment shown in the flow diagram of FIG. 14, the timing compensation values are generated (or updated) prior to writing the product servo sectors to each servo track.

At step 150 the table of expected modulo-N counter values 116 is initialized to values corresponding to the expected locations of the sync marks. At step 152 the PLL for generating the servo write clock 58 is synchronized to reference sync marks recorded at an initial radial location on the disk 18. At step 154 the head is moved radially inward to the first servo track defined by the spiral tracks. At step 156 the coefficients of the sinusoid for estimating the sinusoidal component in the timing recovery measurement are generated (or updated) for one or more revolutions of the disk. During the disk revolution wherein the product servo sectors are written to the disk, at step 158 the timing compensation values are generated using the coefficients of the sinusoid (alternatively they are pre-computed and stored in a table), and at step 160 the product servo sectors are written to the current servo track using the timing compensation values. At step 162 the head is moved to the next servo track defined by the spiral tracks, and the process continues at step 164 until the entire disk is servo written.

Figure 15:
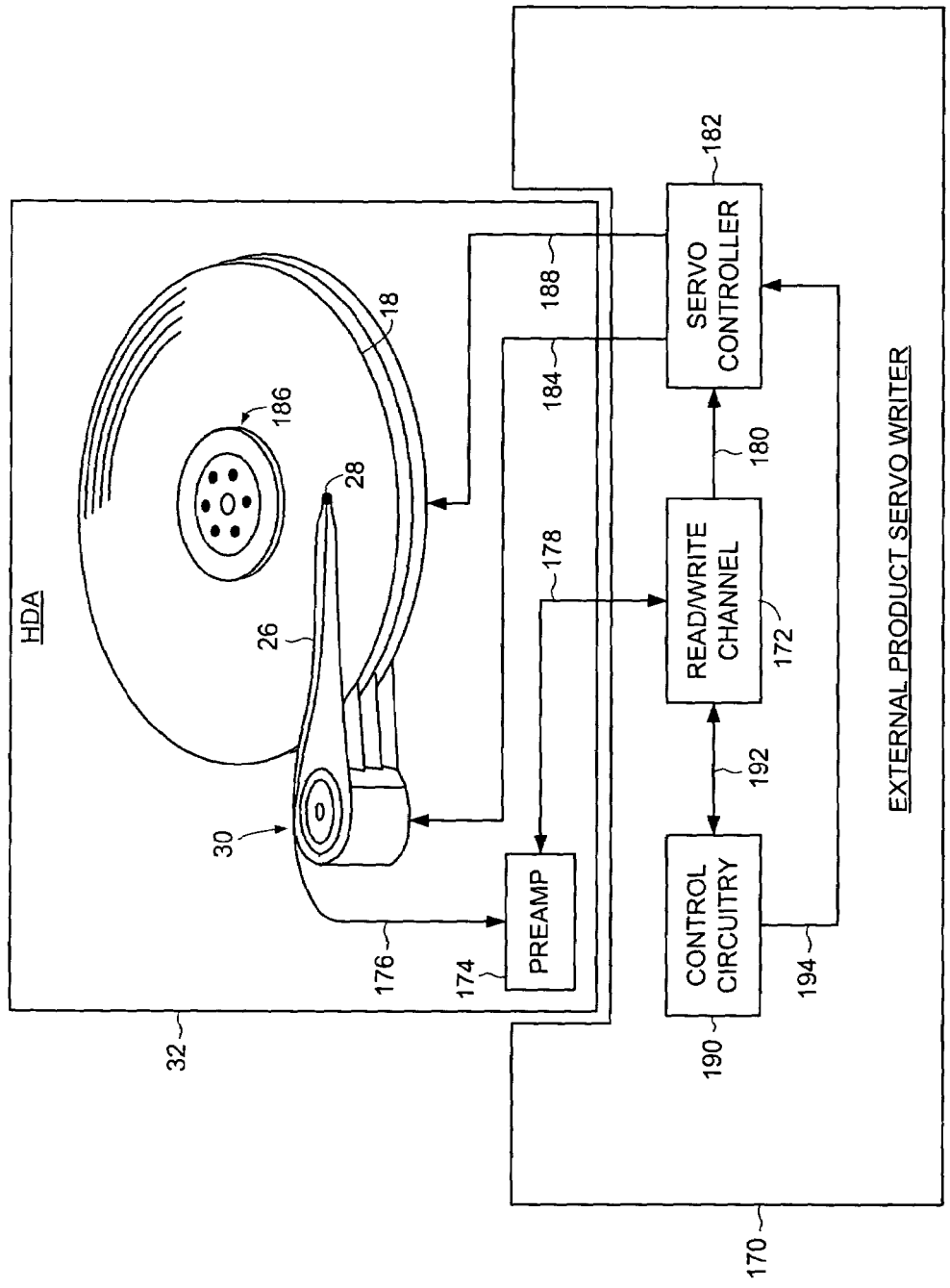
FIG. 15 shows an embodiment of the present invention wherein an external product servo writer is used to process the spiral tracks in order to write the product servo sectors to the disk.
Figure 16:
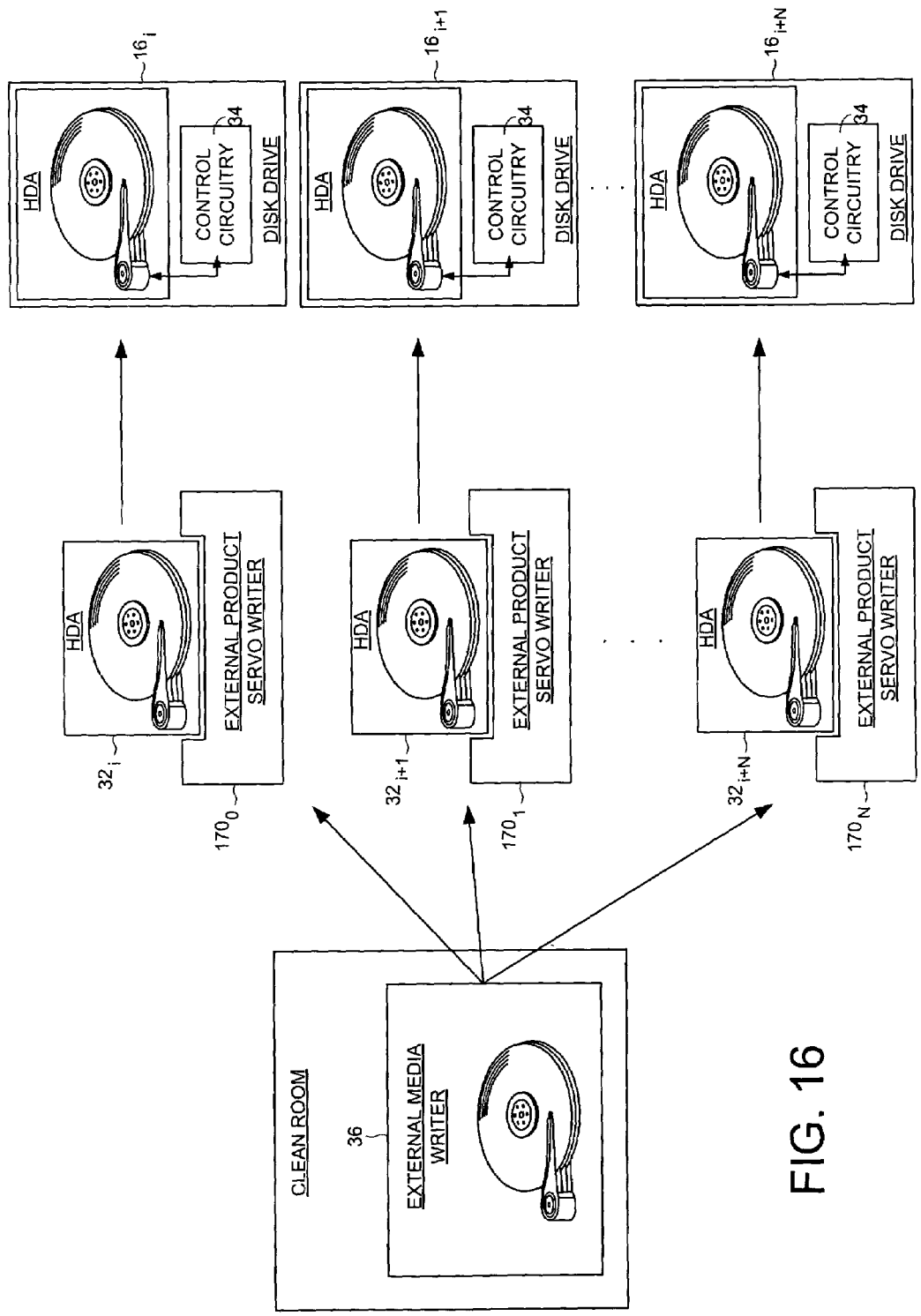
FIG. 16 shows an embodiment of the present invention wherein an external media writer is used to write the spiral tracks, and a plurality of external product servo writers write the product servo sectors for the HDAs output by the external media writer.

FIG. 15 shows an embodiment of the present invention wherein after writing the spiral tracks $20_0$-$20_N$ to the disk 18 (FIG. 3A-3B), an HDA 32 is inserted into an external product servo writer 170 comprising suitable circuitry for reading and processing the spiral tracks $20_0$-$20_N$ in order to write the product servo sectors $56_0$-$56_N$ to the disk 18. The external product servo writer 170 comprises a read/write channel 172 for interfacing with a preamp 174 in the HDA 32. The preamp 174 amplifies a read signal emanating from the head 28 over line 176 to generate an amplified read signal applied to the read/write channel 172 over line 178. The read/write channel 172 comprises circuitry for generating servo burst signals 180 from the high frequency signal 22 (FIG. 5B) in the spiral tracks $20_0$-$20_N$, wherein the servo burst signals are applied to a servo controller 182. The servo controller 182 processes the servo burst signals 180 to generate the PES. The PES is processed to generate a VCM control signal applied to the VCM 30 over line 184 in order to maintain the head 28 along a circular path while writing the product servo sectors $56_0$-$56_N$. The servo controller 182 also generates a spindle motor control signal applied to a spindle motor 186 over line 188 to maintain the disk 18 at a desired angular velocity. Control circuitry 190 processes information received from the read/write channel 172 over line 192 associated with the spiral tracks $20_0$-$20_N$ (e.g., timing information) and provides the product servo sector data to the read/write channel 172 at the appropriate time. The product servo sector data is provided to the preamp 174 which modulates a current in the head 28 in order to write the product servo sectors $56_0$-$56_N$ to the disk 18. The control circuitry 190 also transmits control information over line 194 to the servo controller 182 such as the target servo track to be written. After writing the product servo sectors $56_0$-$56_N$ to the disk 18, the HDA 32 is removed from the external product servo writer 170 and a printed circuit board assembly (PCBA) is mounted to the HDA 32.

Figure 17:
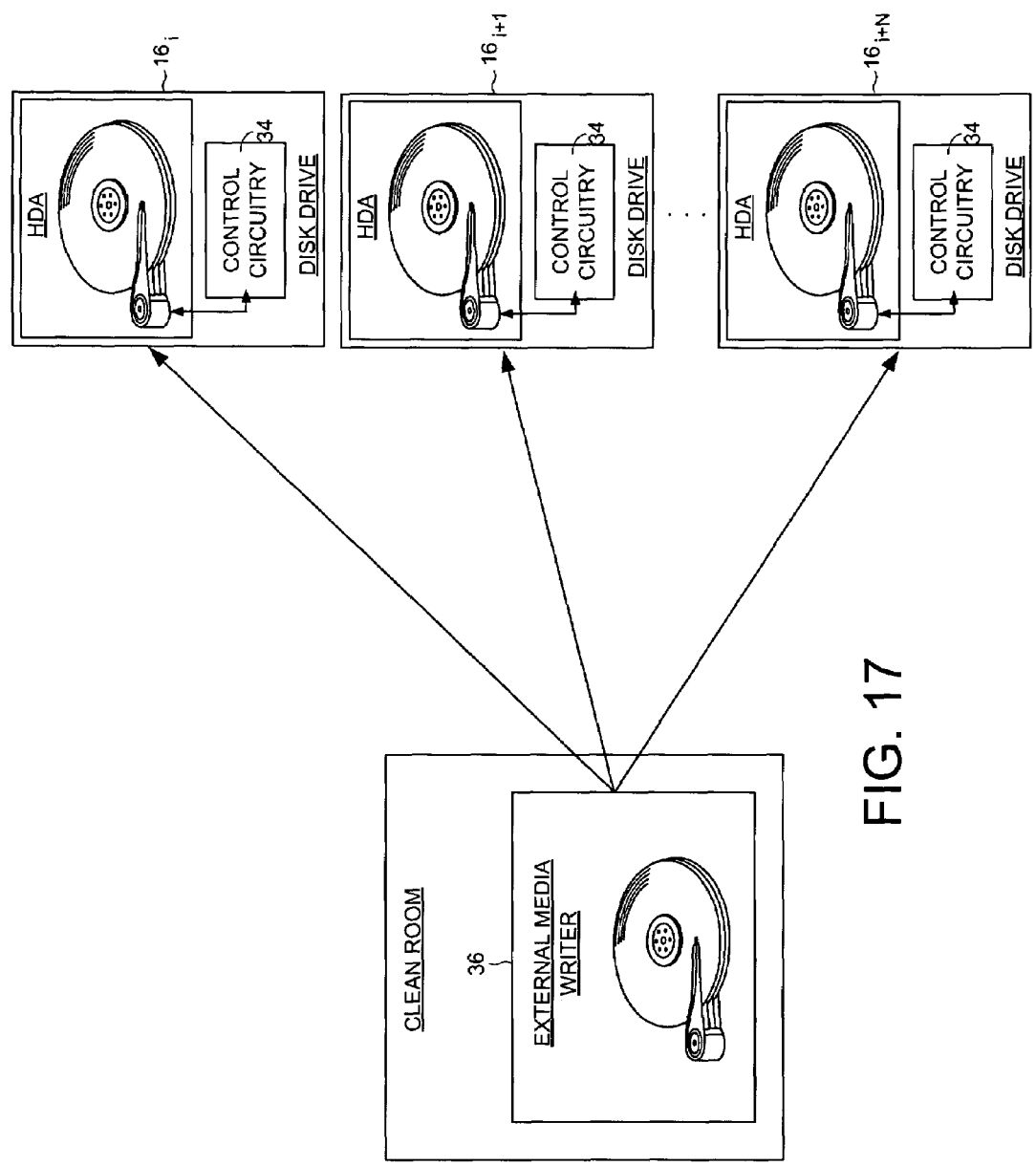
FIG. 17 shows an embodiment of the present invention wherein an external media writer is used to write the spiral tracks, and the control circuitry within each product disk drive is used to write the product servo sectors.

In one embodiment, the external product servo writer 170 of FIG. 15 interfaces with the HDA 32 over the same connections as the PCBA to minimize the modifications needed to facilitate the external product servo writer 170. The external product servo writer 170 is less expensive than a conventional servo writer because it does not require a clean room or sophisticated head positioning mechanics. In an embodiment shown in FIG. 16, a plurality of external product servo writers $170_0$-$170_N$ process the HDAs $32_i$-$32_{i+N}$ of a number of disk drives $16_i$-$16_{i+N}$ in order to write the product servo sectors less expensively and more efficiently than a conventional servo writer. In an alternative embodiment shown in FIG. 17, an external media writer 36 is used to write the spiral tracks onto the disks, and the control circuitry 34 within each product disk drive 16$_i$-16$_{i+N}$ is used to write the product servo sectors.

We claim:

1. A method of writing product servo sectors on a disk of a disk drive, the disk drive comprising control circuitry and a head disk assembly (HDA) comprising the disk, an actuator arm, a head coupled to a distal end of the actuator arm, and a voice coil motor for rotating the actuator arm about a pivot to position the head radially over the disk, the disk comprising a plurality of spiral tracks, each spiral track comprises a high frequency signal interrupted periodically by a sync mark, the method comprising:

using the head internal to the disk drive to read the spiral tracks to generate a read signal;

detecting the sync marks from the read signal to generate a sync mark detect signal;

generating a timing recovery measurement in response to the sync mark detect signal, wherein the timing recovery measurement comprises a sinusoidal component;

generating a timing compensation value in response to the sync mark detect signal, wherein the timing compensation value estimates the sinusoidal component in the timing recovery measurement;

generating a frequency control signal in response to the timing recovery measurement and the timing compensation value;

generating a servo write clock in response to the frequency control signal; and using the servo write clock and the head internal to the disk drive to write the product servo sectors to the disk.

2. The method as recited in claim 1, wherein the spiral tracks are written on the disk using a media writer.

3. The method as recited in claim 2, wherein the timing compensation value estimates the sinusoidal component in the timing recovery measurement due to an eccentricity of the disk when installed into the HDA.

4. The method as recited in claim 1, wherein generating the timing recovery measurement comprises generating a coarse timing recovery measurement from the sync mark detect signal and a fine timing recovery measurement from the high frequency signal.

5. The method as recited in claim 1, wherein generating the timing compensation value comprises adjusting coefficients $\{\hat{a},\hat{b}\}$ of a sinusoid according to:

$$\hat{a}(k+1)=\hat{a}(k)-G^*e(k)^*\cos(2\pi k/N)$$

$$\hat{b}(k+1)=\hat{b}(k)-G^*e(k)^*\sin(2\pi k/N)$$

wherein G is a predetermined gain, e(k) is a timing error, and k is an index representing one of the spiral tracks.

6. The method as recited in claim 5, wherein the timing error e(k) is estimated by:

calculating an estimated sync mark interval (SMI) according to:

$$\text{EST\_SMI}=\text{RI}+\hat{a}^*\cos(2\pi k/N)+\hat{b}^*\sin(2\pi k/N)$$

wherein RI is a reference interval corresponding to a nominal SMI;

detecting an actual SMI by detecting an interval between the head passing over a first and second sync mark in the spiral tracks; and computing a difference between the estimated SMI and the detected actual SMI.

7. The method as recited in claim 5, wherein the timing error e(k) is represented by the timing recovery measurement.

8. The method as recited in claim 1, wherein generating the frequency control signal comprises:

combining the timing recovery measurement with the timing compensation value to generate an adjusted timing recovery measurement; and filtering the adjusted timing recovery measurement.

9. The method as recited in claim 1, wherein generating the frequency control signal comprises:

filtering the timing recovery measurement to generate a filtered timing recovery measurement; and combining the filtered timing recovery measurement with the timing compensation value.

10. A disk drive comprising:

(a) a disk comprising a plurality of spiral tracks, wherein each spiral track comprises a high frequency signal interrupted periodically by a sync mark;

(b) an actuator arm;

(c) a head coupled to a distal end of the actuator arm;

(d) a voice coil motor for rotating the actuator arm about a pivot to position the head radially over the disk; and (e) control circuitry for writing product servo sectors on the disk by:

using the head internal to the disk drive to read the spiral tracks to generate a read signal;

detecting the sync marks from the read signal to generate a sync mark detect signal;

generating a timing recovery measurement in response to the sync mark detect signal, wherein the timing recovery measurement comprises a sinusoidal component;

generating a timing compensation value in response to the sync mark detect signal, wherein the timing compensation value estimates the sinusoidal component in the timing recovery measurement;

generating a frequency control signal in response to the timing recovery measurement and the timing compensation value;

generating a servo write clock in response to the frequency control signal; and using the servo write clock and the head internal to the disk drive to write the product servo sectors to the disk.

11. The disk drive as recited in claim 10, wherein the spiral tracks are written on the disk using a media writer.

12. The disk drive as recited in claim 11, wherein the timing compensation value estimates the sinusoidal component in the timing recovery measurement due to an eccentricity of the disk when installed into the disk drive.

13. The disk drive as recited in claim 10, wherein generating the timing recovery measurement comprises generating a coarse timing recovery measurement from the sync mark detect signal and a fine timing recovery measurement from the high frequency signal.

14. The disk drive as recited in claim 10, wherein generating the timing compensation value comprises adjusting coefficients $\{\hat{a},\hat{b}\}$ of a sinusoid according to:

$$\hat{a}(k+1)=\hat{a}(k)-G^*e(k)^*\cos(2\pi k/N)$$

$$\hat{b}(k+1)=\hat{b}(k)-G^*e(k)^*\sin(2\pi k/N)$$

wherein G is a predetermined gain, e(k) is a timing error, and k is an index representing one of the spiral tracks.

15. The disk drive as recited in claim 14, wherein the timing error e(k) is estimated by:

calculating an estimated sync mark interval (SMI) according to:

$$\text{EST\_SMI}=\text{RI}+\hat{a}^*\cos(2\pi k/N)+\hat{b}^*\sin(2\pi k/N)$$

wherein RI is a reference interval corresponding to a nominal SMI;

detecting an actual SMI by detecting an interval between the head passing over a first and second sync mark in the spiral tracks; and computing a difference between the estimated SMI and the detected actual SMI.

16. The disk drive as recited in claim 14, wherein e(k) is represented by the timing recovery measurement.

17. The disk drive as recited in claim 10, wherein generating the frequency control signal comprises:

combining the timing recovery measurement with the timing compensation value to generate an adjusted timing recovery measurement; and filtering the adjusted timing recovery measurement.

18. The disk drive as recited in claim 10, wherein generating the frequency control signal comprises:

filtering the timing recovery measurement to generate a filtered timing recovery measurement; and combining the filtered timing recovery measurement with the timing compensation value.

\* \* \* \* \*